United States Patent
Eslambolchi et al.

[19]

[11] Patent Number: 6,164,609
[45] Date of Patent: Dec. 26, 2000

[54] UTILITY POLE ANCHOR FOR RESTORATION CABLE SUPPORT

[75] Inventors: Hossein Eslambolchi, Basking Ridge, N.J.; John Sinclair Huffman; James F. Kirkpatrick, both of Conyers, Ga.

[73] Assignee: AT&T Corp., New York, N.Y.

[21] Appl. No.: 09/399,624

[22] Filed: Sep. 20, 1999

[51] Int. Cl.[7] ................................................. A47B 96/06
[52] U.S. Cl. ............................... 248/218.4; 254/134.3 PA
[58] Field of Search .................. 248/218.4, 219.1–219.4, 248/332; 254/4 R, 4 C, 134.3 R, 134.3 PA, 134.3 CL, 384–385

[56] References Cited

U.S. PATENT DOCUMENTS

| | | | |
|---|---|---|---|
| 3,190,111 | 6/1965 | Trussell et al. | 248/219.1 |
| 3,647,171 | 3/1972 | Rafferty | 248/231.85 |
| 4,934,644 | 6/1990 | Nagy et al. | 248/230.8 |
| 5,056,673 | 10/1991 | Williams | 212/179 |
| 5,069,310 | 12/1991 | Williams et al. | 182/187 |
| 5,221,009 | 6/1993 | Ritzenthaler | 211/18 |
| 5,395,081 | 3/1995 | Vollink | 248/218.4 |
| 5,632,461 | 5/1997 | Von Helms et al. | 248/218.4 |
| 5,641,141 | 6/1997 | Goodwin | 248/218.4 |
| 5,941,507 | 8/1999 | Page | 254/134.3 PA |

*Primary Examiner*—Daniel P. Stodola
*Assistant Examiner*—Jennifer E. Novosad

[57] ABSTRACT

A "quick" anchor for placing a temporary restoration cable in place on a utility pole require neither a bucket truck nor ladder to position the anchor and cable. The anchor comprises a non-conductive, hinged cylindrical housing that includes a set of wheels disposed around its perimeter. The housing is positioned to encompass the utility pole at ground level, and then is clamped shut. A technician uses a push bar to move the anchor up the pole, with the wheels facilitating this upward movement. A set of hinged grabbing teeth are disposed around the lower periphery of the anchor to prevent the anchor from descending once it is in place. A pulley assembly is attached to the outside of the anchor and is used to hoist the restoration cable into place.

12 Claims, 2 Drawing Sheets

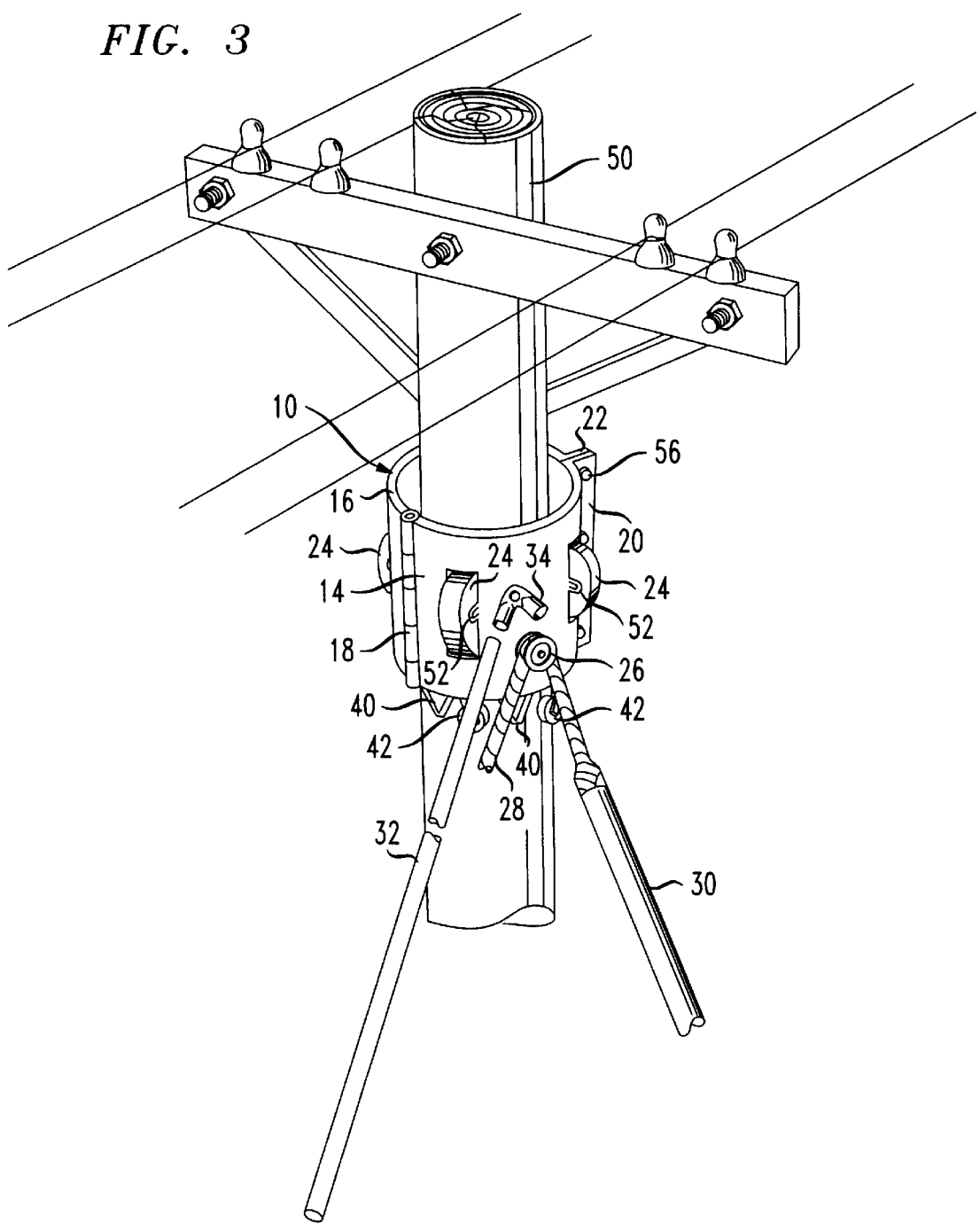

UTILITY POLE ANCHOR FOR RESTORATION CABLE SUPPORT

TECHNICAL FIELD

The present invention relates to an anchor for supporting a restoration cable on a utility pole and, more particularly, to an anchor that can be quickly hoisted in place from the ground without requiring either a ladder or bucket truck to position the anchor.

BACKGROUND OF THE INVENTION

Various services are provided via cables into our homes and businesses. Electricity, cable television and telephone connections are all provided via cable networks that are distributed both underground and above ground across utility poles. When one of these cables fails, time is of the essence in restoring service so that the public is not "out of service" for a long duration. For example, when a fiber optic telecommunications cable fails, millions of circuits are disrupted and hundreds of thousands of dollars are lost for each minute of outage.

Restoration of failed cables must take place in all types of environments, ranging from city streets to rural undeveloped land. In each of these situations, special equipment is needed to quickly get a temporary "restoration" cable in place until a permanent fix can be made. In a city environment, there may often be a need to string a restoration cable across busy intersections and streets, interrupting the flow of traffic (since a bucket truck or large ladder is required to secure the cable). In any environment, the time required for a bucket truck or ladder to arrive at the scene will inevitably add delay to the restoration process.

Thus, a need remains for a quick and efficient method of securing a temporary restoration cable to a utility pole.

SUMMARY OF THE INVENTION

The need remaining in the prior art is addressed by the present invention, which relates to an anchor for supporting a restoration cable on a utility pole and, more particularly, to an anchor that can be quickly hoisted in place from the ground without requiring either a ladder or bucket truck to position the anchor.

In accordance with the present invention, an anchor is formed as a hinged cylindrical member including flanges that can be clamped together once the anchor is in place around the pole (at ground level). The anchor includes a set of non-conductive (e.g., rubber) wheels disposed around the periphery of the cylindrical member, where the wheels facilitate the movement of the anchor up the pole and into position. A push bar assembly, consisting of a long rod that fits into a bracket on the side of the anchor, is used by the repair personnel to push the anchor up the pole. A pulley assembly is disposed on an outside location of the cylindrical member and is used to hoist the restoration cable into place.

In a preferred embodiment of the present invention, a plurality of hinged grabbing teeth are disposed around the lower periphery of the cylindrical member to hold the anchor in place once it is in position.

In one embodiment, the wheels may be spring-loaded so as to adjust size of the anchor to fit different diameter poles.

Other and further embodiments of the present invention will become apparent during the course of the following discussion and by reference to the accompanying drawings.

BRIEF DESCRIPTION OF THE DRAWINGS

Referring now to-drawings where like numerals represent like parts in several views:

FIG. 3 illustrates an exemplary anchor of the present invention in place on a utility pole.

DETAILED DESCRIPTION

Figure 1:
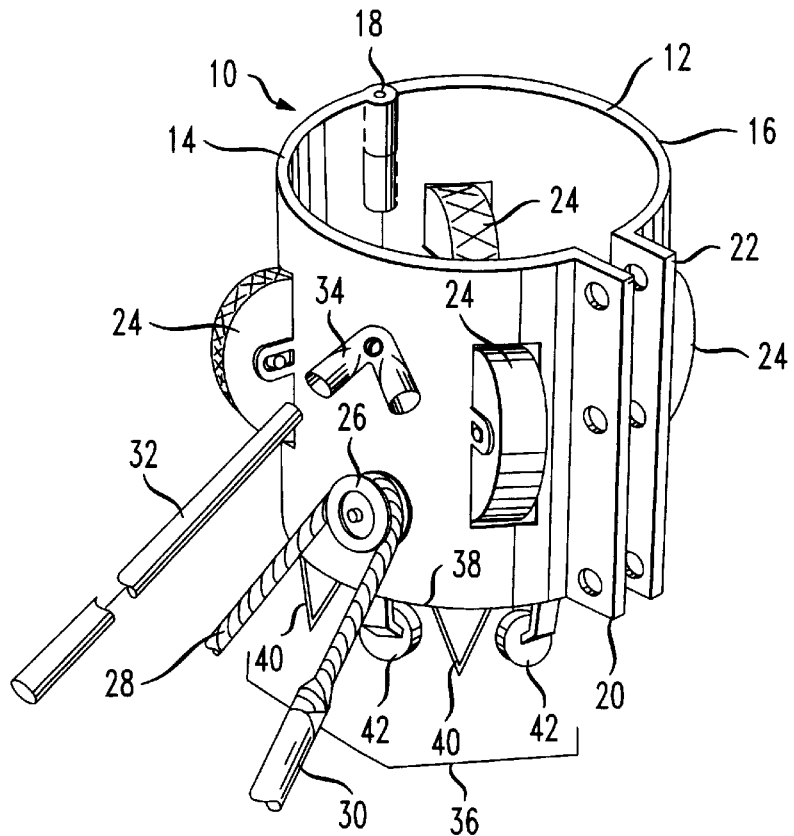
FIG. 1 is an isometric view of the utility pole anchor of the present invention.

An exemplary utility pole anchor 10 formed in accordance with the present invention is illustrated in FIG. 1. Anchor 10 comprises a cylindrical, non-conductive hinged housing 12 formed of a first half 14 and second half 16, held together by a set of hinges 18 (only one such hinge 18 being visible in the view of FIG. 1). In a preferred embodiment, the housing halves 14 and 16 of non-conductive hinged housing 12 comprises a molded plastic material. First half 14 of housing 12 includes a first flanged edge 20 and, similarly, second half 16 of housing 12 includes a second flanged edge 22, where flanged edges 20,22 are disposed in opposition to the set of hinges 18. Once anchor 10 is in place around a utility pole, a set of clamps (not shown in this view) are used to connect flanged edges 20,22 and hold anchor 10 in position on the pole.

As shown in FIG. 1, a plurality of non-conductive wheels 24 are disposed around the periphery of housing 12. These wheels are used to facilitate the movement of anchor 10 from ground level to its raised position on a utility pole. In a preferred embodiment, rubber wheels may be used, with a set of four, evenly disposed wheels considered to be an optimum arrangement. An external pulley assembly 26 is shown as attached to first half 14 of housing 12 (of course, pulley assembly 26 could also be attached to second half 16 of housing 12), with a non-conductive rope 28 positioned in place over pulley 26. Attached to the far end of non-conductive rope 28 is the actual restoration cable 30 that is to be secured to a utility pole.

In accordance with the present invention, anchor 10 is hoisted up a utility pole so as to mount and position restoration cable 30 by using a push rod 32 that is inserted into a push bracket 34 included on housing 12. In use, a technician merely inserts rod 32 into bracket 34 and pushes anchor 10 up the pole, with wheels 24 allowing for free movement of anchor 10 up the pole. Once anchor 10 is in place, it is held in a fixed manner by a plurality of grabbing teeth 36 that are disposed around the bottom edge 38 of housing 12. Preferably, grabbing teeth 36 are attached in a hinged manner on edge 38 so that the teeth do not interfere with the upward movement of anchor 10 but retain the anchor downward. In the preferred embodiment of the present invention as illustrated in FIG. 3, grabbing teeth 36 comprise a plurality of barbed teeth 40 and a plurality of rubber pads 42, disposed in an alternating fashion around the periphery of bottom edge 38. The plurality of barbed teeth 40 thus "dig" into the pole, while rubber pads 42 provide resistance against the surface of the pole, retaining anchor 10 in place after the technician has pushed the anchor up the pole.

Figure 2:
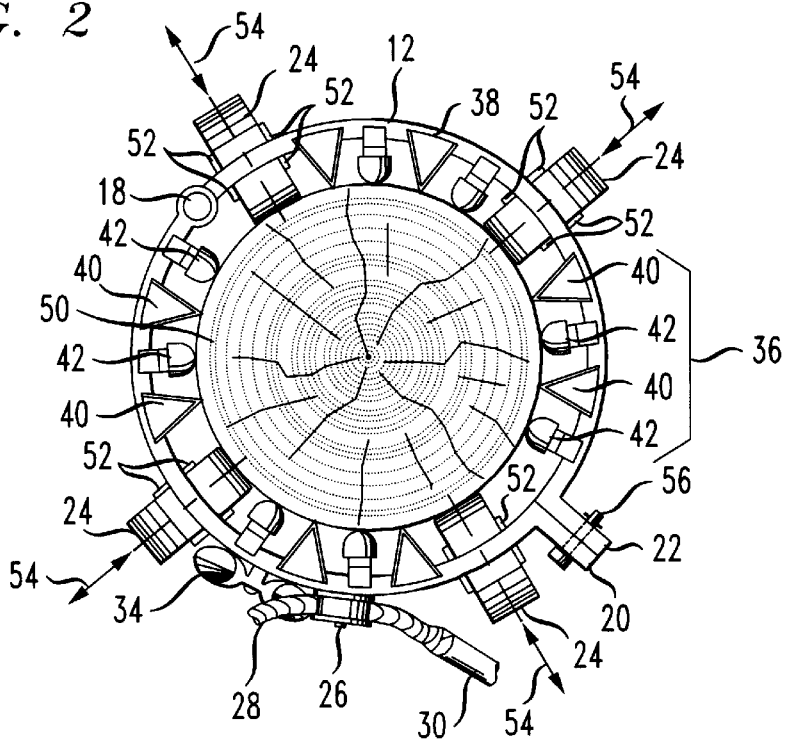
FIG. 2 is a bottom view of the anchor of FIG. 1, illustrating in particular the hinged grabbing teeth and an exemplary disposition of the wheels around the periphery of the anchor.

FIG. 2 is a bottom view of anchor 10 in position around an exemplary utility pole 50. Evident in this view is bottom edge 38 of housing 12 and the pluralities of barbed teeth 40 and rubber pads 42 used to grip into pole 50. As mentioned above, in a preferred embodiment of the present invention, the plurality of wheels 24 are spring-loaded so as to allow for anchor 10 to accommodate different diameter poles. An exemplary spring mechanism 52 is shown in FIG. 2 as attached to wheel 24 through an axle 54. By spring loading wheels 24, they are free to move laterally, as indicated by the arrows in FIG. 2, in a manner such that anchor 10 may adjust to fit over poles that may vary (slightly) in diameter. A clamp 56 is illustrated as positioned through first and second flanges 20 and 22, where clamp 56 functions to hold hinged housing 12 shut in position around pole 50. Although not evident in this view, in a preferred embodiment, a plurality of such clamps 56 would be used.

An exemplary anchor 10 of the present invention is illustrated in FIG. 3 in its raised position on an exemplary utility pole 50. One of the wheels 24 is illustrated in phantom in this view so that the attachment of the hinged members of housing 12 can be clearly shown. Also evident in this view is a pair of hinges 18, used to join together halves 14 and 16 of housing 12. Push rod 32 is illustrated as being removed from push bracket 34. Once anchor 10 is in place, the technician on the ground will pull nonconducting rope 28 through pulley assembly 26 until restoration cable 30 (attached to non-conducting rope 28) moves through pulley assembly 26 and is strung into position. Clearly evident in this view is the presence of grabbing teeth 36, in the form of barbed teeth 40 and rubber pads 42, functioning to hold anchor 10 in position.

Although the above-described embodiment of the present invention illustrated the use of a set of four non-conductive wheels 24, it is to be understood that as little as a pair of wheels may be used and still provide the necessary upward movement of anchor. Additionally, non-conductive materials other than rubber may be used for wheels 24 and, in fact, any suitable plastic material can be used. Similarly, although it is preferred that housing 12 comprise a molded plastic material, any suitable non-conductive material may be used. In general, the subject matter of the present invention is considered to be limited in scope only by the claims appended hereto.

What is claimed is:

1. An anchor for affixing a restoration cable to a pole, the anchor comprising
   a non-conductive, cylindrical hinged housing defined by a first half and a second half, the first and second halves joined at a first end by at least one hinge the opposing, second ends of said first and second halves terminating in a flanged end portion, such that said hinged housing may be disposed to surround a pole, the flanged end portions connected with at least one clamp to provide attachment of said anchor to the pole;
   at least one pair of non-conductive wheels axially attached to said hinged housing and adapted to engage the pole;
   a pulley assembly attached to an outer surface of said hinged housing, said pulley assembly for accommodating a non-conductive rope attached to a restoration cable;
   a push bracket attached to an outer surface of said hinged housing for accommodating a rod for causing upward movement of said anchor along a pole; and
   a plurality of grabbing teeth disposed around a bottom periphery of said cylindrical, hinged housing for maintaining contact between said anchor and the pole.

2. An anchor as defined in claim 1 wherein the non-conductive hinged housing comprises a molded plastic material.

3. An anchor as defined in claim 1 wherein the at least one pair of non-conductive wheels comprises spring-loaded wheels for allowing lateral movement of said wheels with respect to the hinged housing.

4. An anchor as defined in claim 1 wherein the at least one pair of non-conductive wheels comprises rubber wheels.

5. An anchor as defined in claim 1 wherein the at least one pair of non-conductive wheels comprises a set of four wheels.

6. An anchor as defined in claim 1 wherein the at least one hinge comprises a plurality of hinges.

7. An anchor as defined in claim 1 wherein the at least one clamp comprises a plurality of clamps.

8. An anchor as defined in claim 1 wherein the plurality of grabbing teeth are attached in a hinged relationship to the bottom periphery of the hinged housing.

9. An anchor as defined in claim 1 wherein the plurality of grabbing teeth comprises a plurality of barbed teeth for attachment into a pole.

10. An anchor as defined in claim 1 wherein the plurality of grabbing teeth comprises a plurality of rubber pads for providing a frictional force against the surface of a pole.

11. An anchor as defined in claim 1 wherein the plurality of grabbing teeth comprises a first plurality of barbed teeth for attachment into a pole and a second plurality of rubber pads for providing a frictional force against the surface of the pole.

12. An anchor as defined in claim 11 wherein the plurality of barbed teeth and the plurality of rubber pads are disposed in an alternating fashion.

* * * * *